US007679810B2

(12) United States Patent
Fuss et al.

(10) Patent No.: US 7,679,810 B2
(45) Date of Patent: Mar. 16, 2010

(54) ELECTRICAL CHARACTERISTICS OF ELECTROCHROMIC DEVICES

(75) Inventors: Eugene Anthony Fuss, Healdsburg, CA (US); Roger W. Phillips, Santa Rosa, CA (US); Paul P. Nguyen, San Jose, CA (US)

(73) Assignee: Soladigm, Inc., Milpitas, CA (US)

( * ) Notice: Subject to any disclaimer, the term of this patent is extended or adjusted under 35 U.S.C. 154(b) by 0 days.

(21) Appl. No.: 12/165,598

(22) Filed: Jun. 30, 2008

(65) Prior Publication Data

US 2009/0323161 A1    Dec. 31, 2009

(51) Int. Cl.
*G02F 1/153* (2006.01)
*C09K 19/02* (2006.01)
*G09G 3/38* (2006.01)

(52) U.S. Cl. .................. 359/275; 349/182; 345/105

(58) Field of Classification Search ......... 359/272–275, 359/265–270, 277, 245–247, 254; 345/49, 345/105; 349/182–186; 348/814; 250/70; 438/929

See application file for complete search history.

(56) References Cited

U.S. PATENT DOCUMENTS 5,133,594 A * 7/1992 Haas et al. .................. 359/275
5,532,869 A    7/1996 Goldner et al.
6,647,166 B2   11/2003 Richardson
6,773,944 B2 * 8/2004 Okamoto ..................... 438/30
7,042,615 B2   5/2006 Richardson

OTHER PUBLICATIONS

S.A. Bashar, Study of Indium Tin Oxide (ITO) for Novel Optoelectrical Devices, Ph.D. Ph.D thesis, www.betelco.com/sb/phd/index.html, 1998.
D.C. Nguyen et al., Effect of film thickness on the electrical properties of tantalum nitride thin films deposited on SiO2/Si substrates for -type attenuator applications,Journal of Vacuum Science & Technology B: Microelectronics and Nanometer Structures, May 2006, vol. 24, Issue 3, pp. 1398 1401.
H.B. Nie et al., Structural and electrical properties of tantalum nitride thin films fabricated by using reactive radio frequency magnetron sputtering, http://arxiv.org/ftp/cond-mat/papers/0305/0305683.pdf, May 29, 2003.
T. Waechtler et al., Optical Properties of Sputtered Tantalum Nitride Films Determined by Spectroscopic Ellipsometry, http://archiv.tu-chemnitz.de/pub/2006/0032/data/ellips.pdf, Mar. 16, 2006.

* cited by examiner

*Primary Examiner*—Scott J Sugarman
*Assistant Examiner*—Dawayne A Pinkney
(74) *Attorney, Agent, or Firm*—Joseph P. Curtin, L.L.C.

(57) ABSTRACT

One exemplary embodiment of an electrochromic device comprises a tantalum-nitride ion-blocking layer formed between a transparent conductive layer and an electrochromic layer. Another exemplary embodiment of an electrochromic device comprises a tantalum-nitride ion-blocking layer formed between a transparent conductive layer and a counter electrode. Yet another exemplary embodiment of an electrochromic device comprises a type-2 ion-blocking layer formed on a transparent conductive layer as an ion diffusion barrier overlayer. Still another exemplary embodiment of an electrochromic device comprises a transparent conductive layer formed from tantalum nitride.

31 Claims, 4 Drawing Sheets

ELECTRICAL CHARACTERISTICS OF ELECTROCHROMIC DEVICES

BACKGROUND

The subject matter disclosed herein relates to electrochromic (EC) devices. More particularly, the subject matter disclosed herein relates to maintaining the stability of a conductive layer of an electrochromic (EC) device by placing next to the transparent conductor layer an ion barrier layer comprising good electron conducting properties.

The field of electrochromics is extensive and has been developing over the last forty years. For window glazings, electrochromic coatings serve to control the amount of light and heat passing through the glazing by user-controlled applied electrical potentials across the optical stack of the coating. Not only can electrochromic coatings for window glazing reduce the amount of room heating or air conditioning, but it can also be used for privacy. By switching from a clear state having an optical transmission of about 60-80%, to a darkened state having an optical transmission of between 0.1-10%, control of both privacy and energy flow into a room through a window can be achieved. Similarly, a transparent-to-reflective EC device has recently been developed that accomplishes similar heat and/or air conditioning savings. Because the amount of glass used for various types of windows, such as skylights, aircraft windows, residential and commercial building windows, automobile windows, is on the order of one-billion square meters per year, the amount of energy savings is substantial. See, for example, Solar Energy Materials and Solar Cells, (1994) 307-321.

During the time period that the field of electrochromics has been developing, various constructs have been proposed for electrochromic devices, including solution-phase electrochromic devices, solid-state electrochromic devices, gasochromic devices, and photochromic devices. A typical electrochromic cell generally comprises the following construction: Substrate/transparent conductive layer/counter electrode/ion conductor layer/electrochromic layer/transparent conductive layer.

Electrochromic devices require at least one transparent electrical conductor that, for example, can be composed of Indium Tin Oxide (ITO), 80-90% indium oxide with a minor amount of ITO, or fluorine-doped tin oxide ($SnO_2$:F, also abbreviated as FTO), or aluminum doped ZnO (ZnO:Al), sometimes abbreviated as AZO. Recently, in 2006, amorphous zinc indium tin oxide (ZITO) has been disclosed. The transparent conductor is located next to either the cathodic electrochromic layer or next to the anodic counter electrode of an electrochromic device. In order for an electrochromic device to operate efficiently, the transparent conductor layer must maintain its integrity in terms of transparency and conductivity.

Various types of transparent conducting thin films have been employed, such as Indium Tin Oxide (ITO), which is the most commonly used material, although thin metal layers, and fluorine and antimony doped tin oxide, aluminum and fluorine doped aluminum oxide have been used. In any event, conductivities of less than 20Ω/☐ are needed in order to produce a uniform voltage across the face of the conductive layers. Conductivities of even lower than 20Ω/☐ are needed for large panes of glass measuring 3-4 feet across.

Depending on the thickness and deposition process when ITO is used, ITO can have a resistance as low as 10Ω/☐ and an overall transmission of 90% in the visible-wavelength range. To achieve 90% transmission in the visible-wavelength range, however, the resistance must be >100Ω/☐. Typically, ITO has a resistivity of between about $1\times10^{-3}$ to about $5.0\times10^{-4}$ Ω-cm. See, for example, S. A Bashar, "Study of Indium Tin Oxide (ITO) for Novel Optoelectronic Devices" Ph.D. Ph.D thesis, www.betelco.com/sb/phd/index.html, 1998, which is incorporated by reference herein.

In comparison to ITO, ZITO has an average transmission greater than 85% across the visible-wavelength range. A maximum conductivity of $6\times10^2$ S cm$^{-1}$ is obtained for Zn/In/Sn atomic ratio 0.4/0.4/0.2 in the film. See, for example, K. J. Saji et al., "Optical and electrical properties of co-sputtered amorphous transparent conducting zinc indium tin oxide thin films," Thin Solid Films, Volume 516, Issue 18, Pages 6002-6007 (2008).

The conductivity of ITO has been studied extensively and it is believed that the conductivity is due to oxygen vacancies and to the +4 oxidation state of tin providing electrons to the conduction band. The ITO stoichiometry is complex and it is believed to be a mixture of Sn+2, Sn+4 and In+3 bonded to oxygen atoms. If a reducing agent is present, more Sn+2 can be formed, which has shown to reduce the level of conductivity. As ions (Li+, H+ or Na+) are shuttled back and forth, ions may migrate into the transparent conductive layer causing loss of electron conductance in the cell itself as these ions become trapped with the ITO structure, possibly at grain boundaries or at oxygen vacancies. So loss of conductivity in the transparent conductive layer can arise from loss of ions from the EC device (becoming fixed in the ITO layer) or due to formation of Sn+2 and/or metallic particles of Sn or In.

During the manufacture of the cathodic EC layer, lithium is added by co-sputtering to insert lithium into the structure. Metallic lithium is a strong reducing agent and if it comes in contact with the ITO, reduction of the ITO can occur (formation of Sn+2 or metallic Sn or In atoms within the matrix). This results in loss of conductivity and formation of darker ITO (loss of transparency).

In a typical absorptive solid-state electrochromic device, there are five components in the optical stack, a transparent conducting layer, an electrochromic layer (cathode), an ion storage layer, a counter electrode layer (anode) and finally another transparent conductor layer. Cathodic materials, called the "Electrochromic Electrodes," for all solid-state devices include tungsten oxide, $WO_3$ (most common), vanadium oxide ($V_2O_5$), molybdenum oxide ($MO_3$), niobium oxide ($Nb_2O_3$) and iridium oxide ($IrO_2$). Anodic materials, called the "Counter Electrodes," include nickel oxide (NiO), nickel hydroxide (Ni(OH)$_2$, and tungsten-doped NiO. The ion layer is formed from materials that exhibit a poor electron conductor, but a good ion conductor. Examples of such materials include $SiO_2$, $TiO_2$, $Al_2O_3$, and $Ta_2O_5$.

If a voltage of between 1-3 V is applied between the first and second transparent conducting layers, the following reactions take place: At the anode, the following reaction takes place:

Metal Oxide or Polymer or Organic Molecule (Colored)+xM$^+$+xe$^-$ ↔ Metal Oxide or Polymer or Organic Molecule (Transparent), in which M is H$^+$, Li$^+$ or Na$^+$, e is an electron, and x is an integer.

At the cathode, the following reaction takes place:

Metal Oxide or Polymer or Organic Molecule (Transparent)+xM$^+$+xe$^-$ ↔ Metal Oxide or Polymer or Organic Molecule (Colored), in which M is H$^+$, Li$^+$ or Na$^+$, e is an electron, and x is an integer.

In contrast to an absorptive solid-state electrochromic cell described above, reflective devices have an electrochromic layer that change from a transparent state to a reflective state. Two types of reflective electrochromic devices have been developed: (1) devices that use reflective metals as the active electrochromic layer that, when exposed to molecular hydrogen, become transparent as metal hydrides, and (2) devices that use reflective materials as the active electrochromic layer based on antimony or bismuth that, upon insertion of lithium ions, becomes transparent by an application of a current in the visible region of the electromagnetic spectrum.

For the first type of reflective electrochromic devices, a similar reaction takes place electrochemically when the ion layer is an alkali solution layer and a voltage is applied across the cell. In this instance, the alkali water is converted to hydrogen when the voltage is about −1 V below the standard hydrogen electrode (SHE) potential. By convention, this is set at 0 V for the pressure of hydrogen at 1 atmosphere and the solution is a hydrogen acid in which the mean ionic activity is 1.0 (i.e., $2H^+ + 2e^- = H_2$ Half cell potential is zero).

The conversion of alkali water to hydrogen is shown in the equation below:

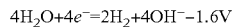
$4H_2O + 4e^- = 2H_2 + 4OH^- - 1.6V$

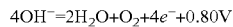
$4OH^- = 2H_2O + O_2 + 4e^- + 0.80V$

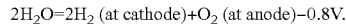
$2H_2O = 2H_2 \text{ (at cathode)} + O_2 \text{ (at anode)} - 0.8V.$

Placing +1.0 V across the cell will force the reaction to proceed and form hydrogen gas as a positive emf drives the reaction. Reducing the voltage to −0.6 V on the cathode (−0.2 V relative to standard hydrogen electrode) allows the reaction to reverse itself and the hydrogen is removed from the metal hydride to from a reflective metallic layer.

For the first type of reflective electrochromic devices, U.S. Pat. No. 6,647,166 B2 to Richardson discloses details of the construction of metal-to-metal hydride EC devices, the disclosure of which is incorporated by reference herein. Similarly, U.S. Pat. No. 7,042,615 B2 to Richardson, the disclosure of which is also incorporated by reference herein, discloses the concept of electrochromic devices comprising a reflective to transparent EC layer of Sb, Bi, and like materials, such as Mg, Mg—Ti, Mg—Ni, Sb—Cu, Sb—Al, as well as metal chalcogenides, such as $TiS_2$, NbSe and tellurides, such $NbTe_2$.

U.S. Pat. No. 5,133,594 to Hass et al. discloses use of ion blocking, optically transparent, electronically conductive layers situated between the transparent conductor layer, i.e., ITO layer, and/or between the counter electrode and the other transparent conductive layer, i.e., the other ITO layer. Hass et al. discloses that layers of ZnO, CdO or SiC are used for blocking block ion transport, i.e., lithium ions from entering the ITO matrix.

U.S. Pat. No. 5,532,869 to Goldner et al., however, disclose that although ZnO, CdO and SiC are generally satisfactory at blocking the migration of lithium ions, these materials are not sufficiently electrically conductive, thereby resulting in electrochromic windows with very poor transmissity switching behavior, very slow switching and/r relatively high voltages needed for switching. Accordingly, Goldner et al. uses two other materials, n- and p-type lithiated silicon carbide, although n-type silicon carbide was the material preferred by Goldner et al. Forming n-type silicon carbide requires the simultaneous deposition of $Li_2CO_3$ and silicon carbide (SiC). Goldner et al. accomplished this by using pellets of $Li_2CO_3$ distributed over a target of SiC or by having separate targets of SiC and $Li_2CO_3$ oriented toward the substrate each with their independently controlled RF power supply.

BRIEF DESCRIPTION OF THE DRAWINGS

The subject matter disclosed herein is illustrated by way of example and not by limitation in the accompanying figures in which like reference numerals indicate similar elements and in which.

DETAILED DESCRIPTION

The word "exemplary" is used herein to mean "serving as an example, instance, or illustration." Any embodiment described herein as "exemplary" is not to be construed as necessarily preferred or advantageous over other embodiments.

The subject matter disclosed herein relates to maintaining the stability of a conductive layer of an electrochromic device by placing next to the transparent conductor layer an ion barrier layer comprising good electron conducting properties. The transparent conductor layer can be formed from, for example, ITO, FTO, AZO and/or ZITO.

Additionally, the subject matter disclosed herein relates to tantalum nitride, particularly $Ta_2N$, which can act as a good ion-blocking layer having a high conductivity that is approximately equal to the conductivity of the ITO layer and is well suited for use in reflective EC devices. The sheet resistance of 50 nm-thick $Ta_2N$ films is approximately 80Ω/□. See, for example, Journal of Vacuum Science & Technology B: Microelectronics and Nanometer Structures, May 2006, Volume 24, Issue 3, pp. 1398-1401. This sheet resistance compares favorably with the 100Ω/□ that is currently used in making EC devices. According to the subject matter disclosed herein, tantalum nitride is formed by either RF or DC sputtering in the presence of $N_2$ and/or $NH_3$, by CVD using precursor organo-metallics gases, or by low-temperature plasma-enhanced chemical vapor deposition (PECVD).

Figure 1:
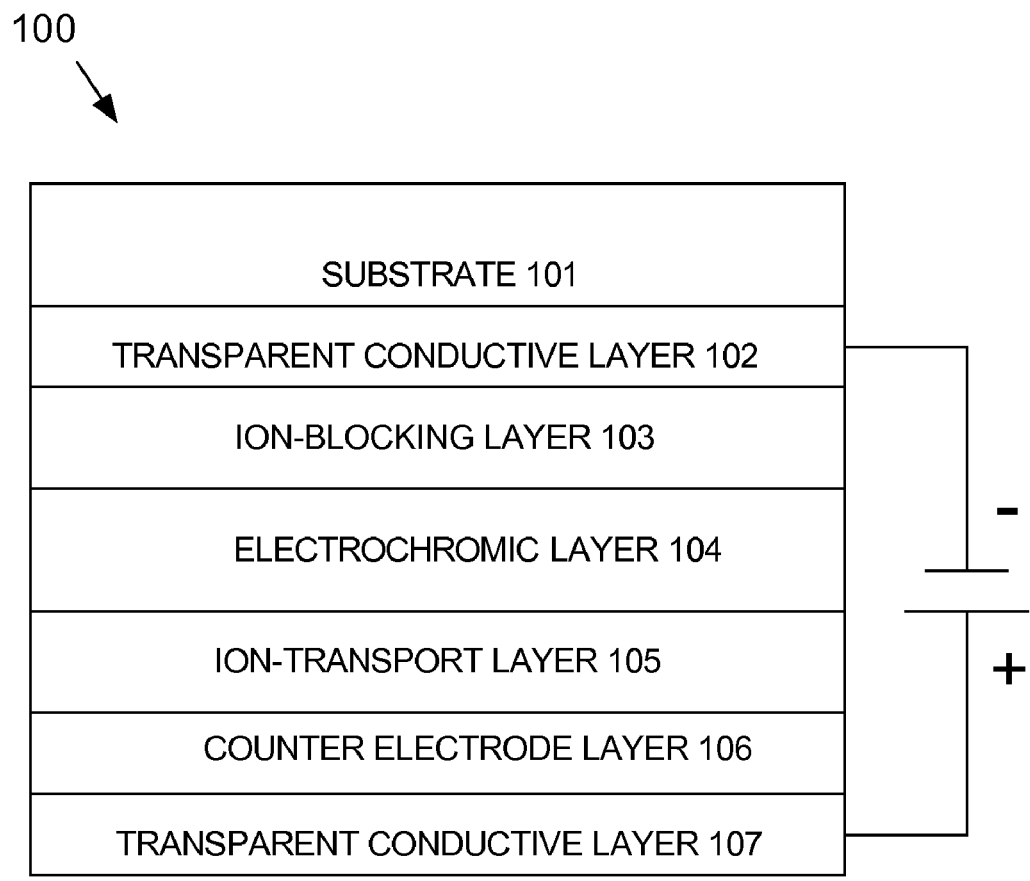
FIG. 1 depicts a first exemplary embodiment of an electrochromic device according to the subject matter disclosed herein.

FIG. 1 depicts a first exemplary embodiment of an electrochromic device 100 according to the subject matter disclosed herein. Electrochromic device 100 comprises a tantalum-nitride ion-blocking layer that is placed between a transparent conductive layer (ITO) and the working cathodic EC layer. One exemplary embodiment of a tantalum-nitride ion-blocking layer would be formed have a thickness in the range of about 5 nm to about 50 nm. An alternative exemplary embodiment of a tantalum-nitride ion-blocking layer would be formed to have a thickness of between about 5 nm to about 15 nm.

Referring to FIG. 1, electrochromic device 100 comprises a substrate 101, such as glass, a first transparent conductive layer 102 that is formed in a well-known manner on substrate 101, an ion-blocking layer 103 that is formed in a well-known manner on first transparent conductive layer 102, a transparent-to-reflective electrochromic (EC) layer 104 that is formed in a well-known manner on ion-blocking layer 103, an ion-transport layer 105 that is formed in a well-known manner on transparent-to-reflective EC layer 104, a counter electrode layer 106 that is formed in a well-known manner on ion-transport layer 105, and a second transparent conductive layer 107 that is formed in a well-known manner on counter electrode layer 106. The voltage depicted as being applied between the conductive layers represents a user-controlled electrical potential for controlling the electrochromic reaction of the device.

Figure 2:
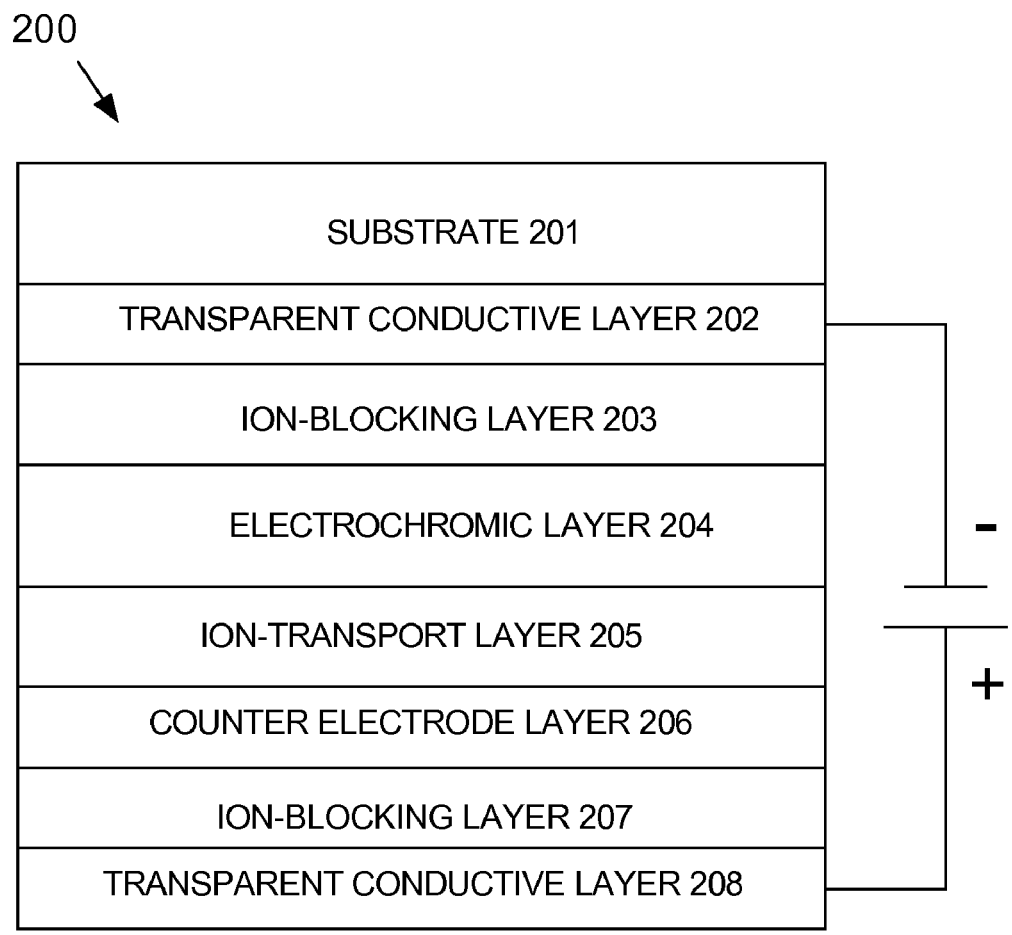
FIG. 2 depicts a second exemplary embodiment of an electrochromic device according to the subject matter disclosed herein.

FIG. 2 depicts a second exemplary embodiment of an electrochromic device 200 according to the subject matter disclosed herein. Electrochromic device 200 comprises a tantalum-oxide ion-blocking layer that is formed between a first transparent conductive layer and the working cathodic EC layer, and a tantalum-oxide ion-blocking layer that is formed between the counter-electrode layer and a second transparent conductive layer. One exemplary embodiment of a tantalum-nitride ion-blocking layer would be formed have a thickness in the range of about 5 nm to about 50 nm. An alternative exemplary embodiment of a tantalum-nitride ion-blocking layer would be formed to have a thickness of between about 5 nm to about 15 nm.

As depicted in FIG. 2, electrochromic device 200 comprises a substrate 201, such as glass, a first transparent conductive layer 202 that is formed in a well-known manner on substrate 201, an ion-blocking layer 203 that is formed in a well-known manner on first transparent conductive layer 202, a transparent-to-reflective electrochromic (EC) layer 204 that is formed in a well-known manner on ion-blocking layer 203, an ion-transport layer 205 that is formed in a well-known manner on transparent-to-reflective EC layer 204, a counter-electrode layer 206 that is formed in a well-known manner on ion-transport layer 205, a second ion-blocking layer 207 that is formed in a well-known manner on counter-electrode layer 206, and a second transparent conductive layer 208 that is formed in a well-known manner on second ion-blocking layer 207. The voltage depicted as being applied between the conductive layers represents a user-controlled electrical potential for controlling the electrochromic reaction of the device.

Figure 3:
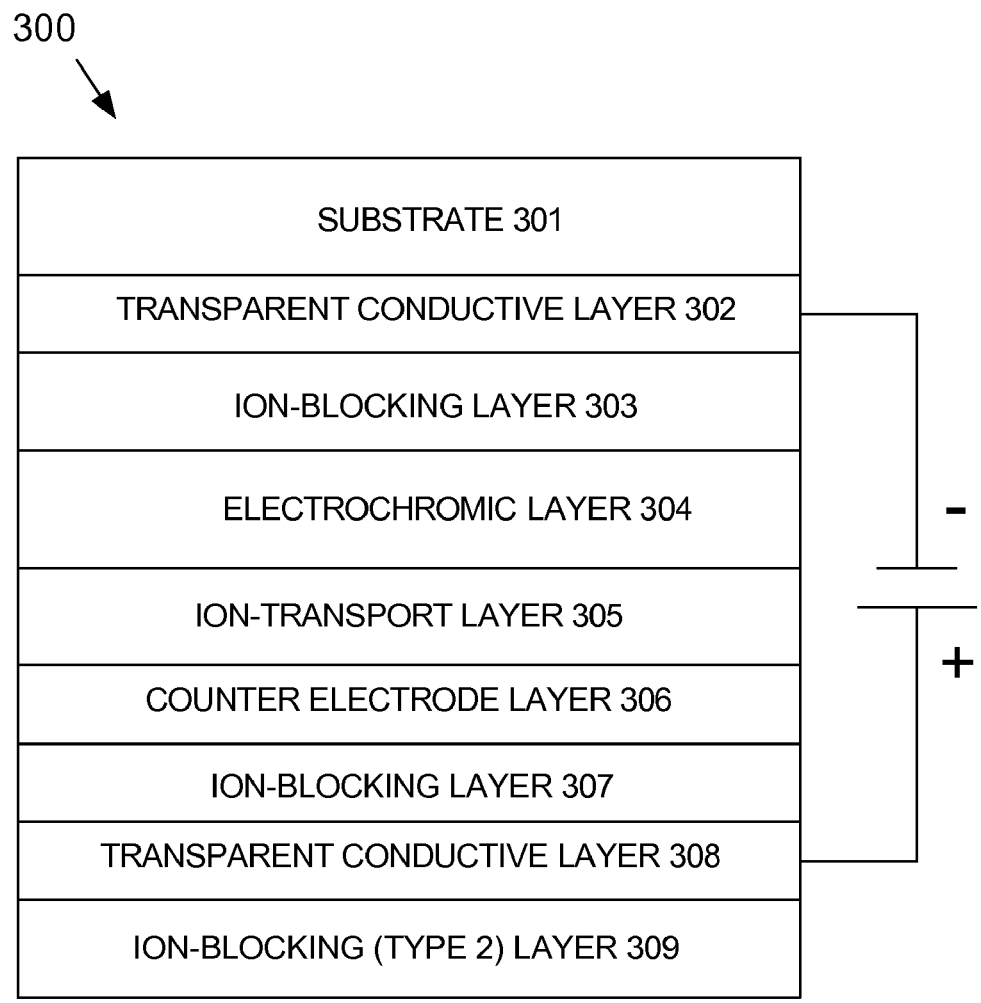
FIG. 3 depicts a third exemplary embodiment of an electrochromic device 300 according to the subject matter disclosed herein.

An electrically non-conductive nitride or oxynitride composition could also be used as an ion diffusion barrier overlayer on top of the second transparent conductive layer (layer 208) to limit the tendency of lithium ions to diffuse to the top surface of the top electrode where conversion of the mobile ions to a carbonate, a hydroxide and/or an oxide composition would result from exposure to an air atmosphere, and would act like a "sink" for the mobile ions, thereby drawing the mobile ions away from the active electrochromic layers. Alternatively, materials such as silicon nitride, silicon oxynitride or other electrically non-conductive nitride compositions (type-2 ion-blocking layers) could be used to further limit the mobile ion diffusion away from the active electrochromic layer, such as shown in FIG. 3. In one exemplary embodiment, the ion diffusion barrier overlayer is formed to have a thickness of about 5 nm to about 150 nm. In another exemplary embodiment, the ion diffusion barrier overlayer is formed to have a thickness of about 5 nm to about 10 nm.

FIG. 3 depicts a third exemplary embodiment of an electrochromic device 300 according to the subject matter disclosed herein. Electrochromic device 300 is similar to electrochromic device 200, but further comprises a type-2 ion-blocking layer that is formed on the second transparent conductive layer. More specifically, electrochromic device 300 comprises a substrate 301, such as glass, a first transparent conductive layer 302 that is formed in a well-known manner on substrate 301, an ion-blocking layer 303 that is formed in a well-known manner on first transparent conductive layer 302, a transparent-to-reflective electrochromic (EC) layer 304 that is formed in a well-known manner on ion-blocking layer 303, an ion-transport layer 305 that is formed in a well-known manner on transparent-to-reflective EC layer 304, a counter-electrode layer 306 that is formed in a well-known manner on ion-transport layer 305, a second ion-blocking layer 307 that is formed in a well-known manner on counter-electrode layer 306, a second transparent conductive layer 308 that is formed in a well-known manner on second ion-blocking layer 307, and a Type-2 ion-blocking layer 309 is formed in a well-known manner on second transparent conductive layer 308. The voltage depicted as being applied between the conductive layers represents a user-controlled electrical potential for controlling the electrochromic reaction of the device.

Figure 4:
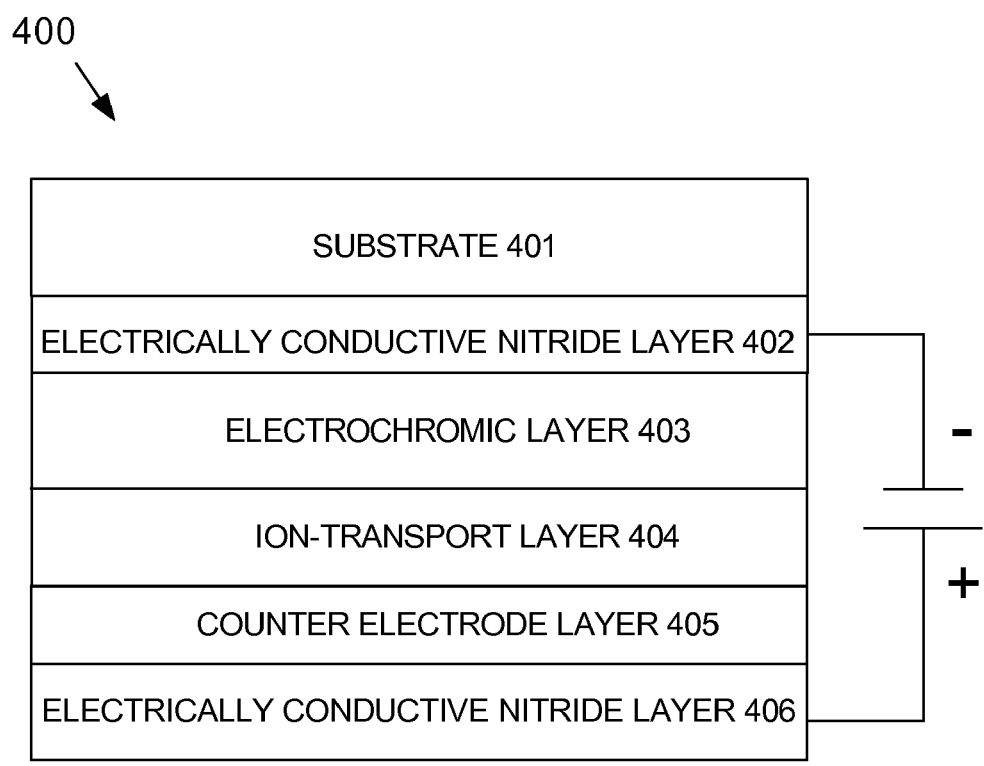
FIG. 4 depicts a fourth exemplary embodiment of an electrochromic device 400 according to the subject matter disclosed herein.

Tantalum nitride could also be used as the actual electrodes under and over the active electrochromic layers, such as depicted in FIG. 4. Electrochromic device 400 is similar to electrochromic device 100, but comprises an electrically conductive nitride layer in place of a transparent conductive layer formed from, for example, ITO. FIG. 4 depicts a fourth exemplary embodiment of an electrochromic device 400 according to the subject matter disclosed herein. In particular, electrochromic device 400 comprises a substrate 401, such as glass, a first electrically conductive nitride layer 402 that is formed in a well-known manner on substrate 401, a transparent-to-reflective electrochromic (EC) layer 403 that is formed in a well-known manner on electrically conductive nitride layer 402, an ion-transport layer 404 that is formed in a well-known manner on transparent-to-reflective EC layer 403, a counter electrode layer 405 that is formed in a well-known manner on ion-transport layer 404, and a second electrically conductive nitride layer 406 that is formed in a well-known manner on counter electrode layer 405. The voltage depicted as being applied between the conductive layers represents a user-controlled electrical potential for controlling the electrochromic reaction of the device.

One exemplary embodiment of an electrically conductive nitride layer, such as tantalum nitride layer, would be formed have a thickness in the range of about 5 nm to about 50 nm. An alternative exemplary embodiment of an electrically conductive nitride layer, such as tantalum nitride, would be formed to have a thickness of between about 5 nm to about 15 nm.

While each of the four exemplary embodiments of FIGS. 1-4 are depicted as being formed with a substrate at the "top" of the optical stack, it should be understood that each of the four exemplary embodiments could be formed with the substrate at the "bottom" of the optical stack. Additionally, while each of the exemplary embodiments of FIGS. 1-3 are depicted comprising a transparent conductive layer formed from ITO, FTO, AZO and/or ZITO, it should be understood that each of the exemplary embodiments could be formed so that one of the transparent conductive layers is formed from tantalum nitride.

Although the foregoing disclosed subject matter has been described in some detail for purposes of clarity of understanding, it will be apparent that certain changes and modifications may be practiced that are within the scope of the appended claims. Accordingly, the present embodiments are to be considered as illustrative and not restrictive, and the subject matter disclosed herein is not to be limited to the details given herein, but may be modified within the scope and equivalents of the appended claims.

What is claimed is:

1. An electrochromic device, comprising a tantalum-nitride ion-blocking layer formed between a transparent conductive layer and an electrochromic layer.

2. The electrochromic device according to claim 1, wherein tantalum-nitride ion-blocking layer has a thickness of between about 5 nm to about 50 nm.

3. The electrochromic device according to claim 2, wherein tantalum-nitride ion-blocking layer has a thickness of between about 5 nm to about 15 nm.

4. The electrochromic device according to claim 2, further comprising a type-2 ion-blocking layer formed on the transparent conductive layer on a side of the transparent electrically conductive layer that is remote from the electrochromic layer.

5. The electrochromic device according to claim 2, wherein the transparent conductive layer comprises at least one of indium tin oxide (ITO), fluorine-doped tin oxide (FTO), aluminum doped ZnO (AZO) and zinc indium tin oxide (ZITO).

6. The electrochromic device according to claim 1, further comprising a second transparent conductive layer formed from tantalum nitride.

7. The electrochromic device according to claim 1, further comprising a second tantalum-nitride ion-blocking layer formed between a second transparent conductive layer and a counter electrode.

8. The electrochromic device according to claim 7, wherein the second tantalum-nitride ion-blocking layer has a thickness of between about 5 nm to about 50 nm.

9. The electrochromic device according to claim 8, wherein the second tantalum-nitride ion-blocking layer has a thickness of between about 5 nm to about 15 nm.

10. The electrochromic device according to claim 8, further comprising a type-2 ion-blocking layer formed on the second transparent conductive layer on a side of the second transparent electrically conductive layer that is remote from the counter electrode layer of the electrochromic device.

11. The electrochromic device according to claim 8, wherein the second transparent conductive layer comprises at least one of indium tin oxide (ITO), fluorine-doped tin oxide (FTO), aluminum doped ZnO (AZO) and zinc indium tin oxide (ZITO).

12. An electrochromic device, comprising a tantalum-nitride ion-blocking layer formed between a transparent conductive layer and a counter electrode layer.

13. The electrochromic device according to claim 12, wherein tantalum-nitride ion-blocking layer has a thickness of between about 5 nm to about 50 nm.

14. The electrochromic device according to claim 13, wherein tantalum-nitride ion-blocking layer has a thickness of between about 5 nm to about 15 nm.

15. The electrochromic device according to claim 13, further comprising a type-2 ion-blocking layer formed on the transparent conductive layer on a side of the transparent electrically conductive layer that is remote from the counter electrode layer.

16. The electrochromic device according to claim 13, wherein the transparent conductive layer comprises at least one of indium tin oxide (ITO), fluorine-doped tin oxide (FTO), aluminum doped ZnO (AZO) and zinc indium tin oxide (ZITO).

17. The electrochromic device according to claim 12, further comprising a second transparent conductive layer formed from tantalum nitride.

18. The electrochromic device according to claim 12, further comprising a second tantalum-nitride ion-blocking layer formed between a second transparent conductive layer and an electrochromic layer.

19. The electrochromic device according to claim 18, wherein the second tantalum-nitride ion-blocking layer has a thickness of between about 5 nm to about 50 nm.

20. The electrochromic device according to claim 19, wherein the second tantalum-nitride ion-blocking layer has a thickness of between about 5 nm to about 15 nm.

21. The electrochromic device according to claim 19, further comprising a type-2 ion-blocking layer formed on the second transparent conductive layer on a side of the second transparent electrically conductive layer that is remote from the electrochromic layer.

22. The electrochromic device according to claim 19, wherein the transparent conductive layer comprises at least one of indium tin oxide (ITO), fluorine-doped tin oxide (FTO), aluminum doped ZnO (AZO) and zinc indium tin oxide (ZITO).

23. An electrochromic device comprising a transparent conductive layer formed from-tantalum nitride.

24. The electrochromic device according to claim 23, further comprising a second transparent conductive layer formed tantalum nitride.

25. The electrochromic device according to claim 23, further comprising
a second transparent conductive layer; and
a tantalum-nitride ion-blocking layer formed between the second transparent conductive layer and an electrochromic layer.

26. The electrochromic device according to claim 25, wherein tantalum-nitride ion-blocking layer has a thickness of between about 5 nm to about 50 nm.

27. The electrochromic device according to claim 25, further comprising a type-2 ion-blocking layer formed on the second transparent conductive layer on a side of the second transparent electrically conductive layer that is remote from the electrochromic layer.

28. The electrochromic device according to claim 25, wherein the second transparent conductive layer comprises at least one of indium tin oxide (ITO), fluorine-doped tin oxide (FTO), aluminum doped ZnO (AZO) and zinc indium tin oxide (ZITO).

29. The electrochromic device according to claim 23, further comprising
a second transparent conductive layer; and
a tantalum-nitride ion-blocking layer formed between the second transparent conductive layer and a counter electrode layer.

30. The electrochromic device according to claim 29, wherein tantalum-nitride ion-blocking layer has a thickness of between about 5 nm to about 50 nm.

31. The electrochromic device according to claim 29, further comprising a type-2 ion-blocking layer formed on the second transparent conductive layer on a side of the second transparent electrically conductive layer that is remote from the counter electrode layer.

* * * * *